(12) United States Patent
Ogino (10) Patent No.: US 9,139,062 B2
(45) Date of Patent: Sep. 22, 2015

(54) VEHICLE CONTROL DEVICE

(71) Applicant: AISIN SEIKI KABUSHIKI KAISHA, Kariya-shi (JP)

(72) Inventor: Atsuto Ogino, Chiryu (JP)

(73) Assignee: AISIN SEIKI KABUSHIKI KAISHA, Kariya-Shi, Aichi-Ken (JP)

(*) Notice: Subject to any disclaimer, the term of this patent is extended or adjusted under 35 U.S.C. 154(b) by 0 days.

(21) Appl. No.: 14/294,907

(22) Filed: Jun. 3, 2014

(65) Prior Publication Data
US 2014/0358372 A1 Dec. 4, 2014

(30) Foreign Application Priority Data
Jun. 4, 2013 (JP) .................. 2013-118255

(51) Int. Cl.
| | |
|---|---|
| B60G 17/016 | (2006.01) |
| B60G 17/0195 | (2006.01) |
| B60T 8/1755 | (2006.01) |
| B60W 30/02 | (2012.01) |
| B60G 17/06 | (2006.01) |
| B60W 30/04 | (2006.01) |

(52) U.S. Cl.
CPC ........ B60G 17/0164 (2013.01); B60G 17/0195 (2013.01); B60G 17/06 (2013.01); B60T 8/17555 (2013.01); B60W 30/025 (2013.01); *B60G 2400/208* (2013.01); *B60G 2400/39* (2013.01); *B60G 2500/10* (2013.01); *B60T 2220/04* (2013.01); *B60T 2260/06* (2013.01); *B60W 2030/041* (2013.01)

(58) Field of Classification Search
USPC .......................................................... 701/38
See application file for complete search history.

(56) References Cited

U.S. PATENT DOCUMENTS

| | | | | |
|---|---|---|---|---|
| 6,263,261 | B1 * | 7/2001 | Brown et al. ................ 701/1 |
| 7,489,995 | B2 * | 2/2009 | Yasui et al. ................ 701/37 |
| 7,644,936 | B2 * | 1/2010 | Lee ....................... 280/5.521 |
| 7,873,458 | B2 * | 1/2011 | Todd ........................... 701/70 |
| 8,437,950 | B2 * | 5/2013 | Schramm et al. ........ 701/124 |
| 8,560,173 | B2 * | 10/2013 | Matsuda ..................... 701/38 |

(Continued)

FOREIGN PATENT DOCUMENTS

| | | |
|---|---|---|
| EP | 1 645 455 A2 | 4/2006 |
| JP | 2008-024143 A | 2/2008 |
| JP | 2011-173503 A | 9/2011 |
| JP | 2012-166701 A | 9/2012 |
| WO | 91/08120 A1 | 6/1991 |
| WO | 2010/049769 A1 | 5/2010 |

OTHER PUBLICATIONS

The extended European Search Report issued on Oct. 2, 2014, by the European Patent Office in corresponding European Patent Application No. 14171017.8-1756. (6 pages).

*Primary Examiner* — Thomas Tarcza
*Assistant Examiner* — Alex C Dunn
(74) *Attorney, Agent, or Firm* — Buchanan Ingersoll & Rooney PC (57) ABSTRACT

A vehicle control device includes a detection portion detecting a master cylinder pressure which is an oil pressure applied by a master cylinder changing a depression force applied to a brake pedal into the oil pressure and a control portion controlling a suspension to restrain a vehicle from tilting forward caused by a depression of the brake pedal based on a variation of the master cylinder pressure, the control portion controlling the suspension to restrain the vehicle from swinging back from a tilting forward attitude caused by a release of the brake pedal based on the variation of the master cylinder pressure.

17 Claims, 7 Drawing Sheets

(56) References Cited

U.S. PATENT DOCUMENTS 8,565,993 B2 * 10/2013 Lu et al. .................... 701/70
8,793,035 B2 * 7/2014 Yu et al. .................... 701/1
8,886,403 B2 * 11/2014 Battlogg et al. ............ 701/37

2006/0076740 A1 4/2006 Sugiyama
2008/0054577 A1 3/2008 Horiuchi
2011/0213527 A1 9/2011 Itabashi et al.
2012/0046831 A1 * 2/2012 Hidaka et al. ............. 701/38

* cited by examiner

VEHICLE CONTROL DEVICE

CROSS REFERENCE TO RELATED APPLICATIONS

This application is based on and claims priority under 35 U.S.C. §119 to Japanese Patent Application 2013-118255, filed on Jun. 4, 2013, the entire content of which is incorporated herein by reference.

TECHNICAL FIELD

This disclosure generally relates to a vehicle control device.

BACKGROUND DISCUSSION

When an operator performs braking operation by depressing a brake pedal of a vehicle, the vehicle may tilt forward by allowing the front of the vehicle to dive while the rear of the vehicle lift due to the load shift toward the front of the vehicle. Technologies to control damping force of shock absorbers accommodated in suspensions are disclosed in JP2011-173503A (hereinafter referred to as Patent reference 1) and JP2008-24143A (hereinafter referred to as Patent reference 2) to restrain the vehicle from tilting forward.

However, as disclosed in Patent reference 1, the vehicle needs to include various sensors to detect a pitching motion of the vehicle.

Further, when the operator releases the brake pedal from a state where the operator depresses the brake pedal, the vehicle swings back from a tilting forward attitude, leading to poor ride comfort for the operator. However, as disclosed in Patent reference 2, it is difficult to restrain the vehicle from swinging back from the tilting forward attitude.

A need thus exists for a vehicle control device which is not susceptible to the drawback mentioned above.

SUMMARY

According to an aspect of the disclosure, a vehicle control device includes a detection portion detecting a master cylinder pressure which is an oil pressure applied by a master cylinder changing a depression force applied to a brake pedal into the oil pressure and a control portion controlling a suspension to restrain a vehicle from tilting forward caused by a depression of the brake pedal based on a variation of the master cylinder pressure, the control portion controlling the suspension to restrain the vehicle from swinging back from a tilting forward attitude caused by a release of the brake pedal based on the variation of the master cylinder pressure.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A vehicle control device and a vehicle control system of an embodiment will be explained referring to an example in which the vehicle control device and the vehicle control system are mounted to a vehicle 1.

The vehicle 1 of the embodiment may be, for example, a vehicle including an internal combustion engine as a driving source, an electric vehicle or a fuel cell vehicle including an electric motor as the driving source, and a hybrid vehicle including both the internal combustion engine and the electric motor as the driving source. The vehicle 1 may be provided with various types of transmissions as well as any systems and components required to drive the internal combustion engine and the electric motor. Further, a device for driving wheels 3 of the vehicle 1 may be desirably systemized with any numbers and any arrangements.

Figure 1:
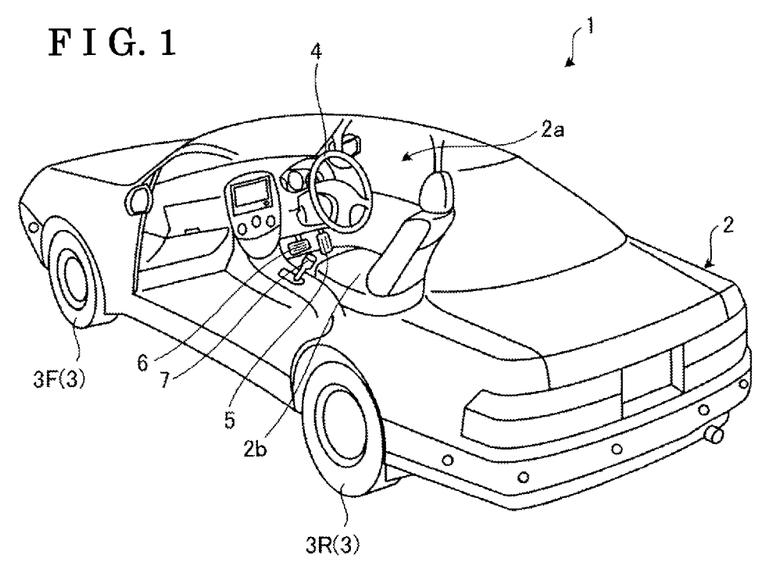
FIG. 1 is a perspective view of a vehicle particularly showing a part of a compartment of the vehicle according to an embodiment disclosed here.

As illustrated in FIG. 1, a vehicle body 2 includes a vehicle compartment 2a that accommodates an operator. The vehicle compartment 2a includes a steering portion 4, an acceleration operating portion 5, a brake operating portion 6 and a shift operation portion 7 all facing a seat 2b of the operator who is an occupant of the vehicle 1. In the embodiment, the steering portion 4 is, for example, a steering wheel protruding from a dash board, or an instrument panel, the acceleration operating portion 5 is, for example, an acceleration pedal positioned at the operator's feet, the brake operating portion 6 is, for example, a brake pedal positioned at the operator's feet, and the shift operation portion 7 is, for example, a shift lever protruding from a center console, however, are not limited to them. Hereinafter, the brake operating portion 6 is referred to as a brake pedal 6.

As illustrated in FIG. 1, according to the embodiment, the vehicle 1 is, for example, a four-wheel vehicle and is provided with right-and-left two front wheels 3F, 3F, and right-and-left two rear wheels 3R, 3R. According to the embodiment, the four wheels 3 are configured so as to be steerable.

Figure 2:
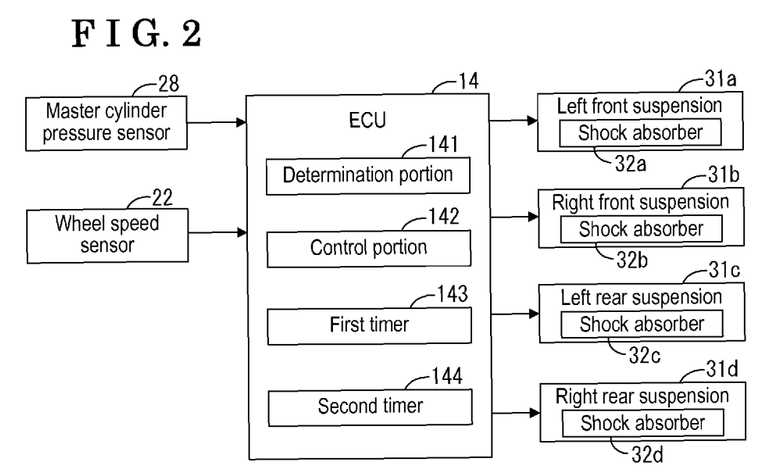
FIG. 2 is a block diagram showing a structure of a vehicle control system and a functional structure of an ECU.
Figure 3:
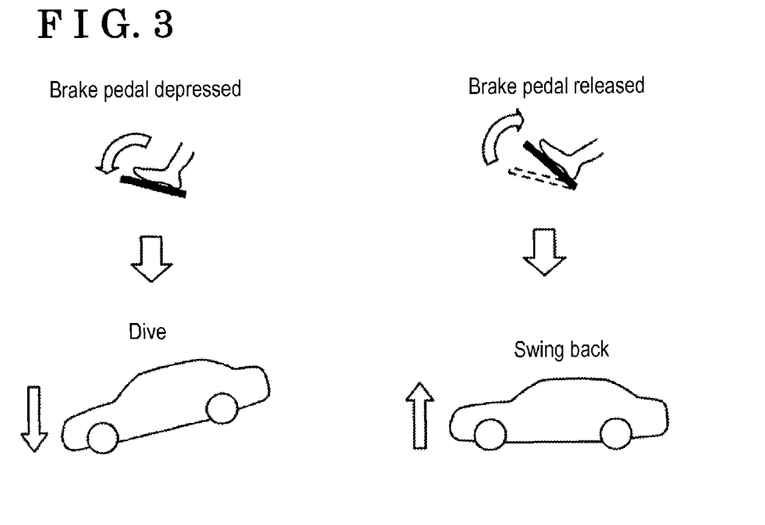
FIG. 3 is an explanatory view illustrating a dive of the vehicle by the depression of a brake pedal and a swing back from the dive of the vehicle by the release of the brake pedal.

Next, the configuration of the vehicle control system mounted to the vehicle 1 of the embodiment will be explained. As illustrated in FIG. 2, the vehicle control system of the embodiment mainly includes an electric control unit, or ECU 14 as the vehicle control device (control portion), a master cylinder pressure sensor 28 (serving as a detection portion), and a wheel speed sensor 22, and suspensions 31a, 31b, 31c, 31d.

A master cylinder changes depressing force applied to the brake pedal 6 by depressing the brake pedal 6 to oil pressure and a master cylinder pressure sensor 28 is a sensor detecting the oil pressure, or master cylinder pressure, applied to brake oil accommodated in the master cylinder. The wheel speed sensor 22 is a sensor detecting the rotation amount of the wheel 3 and the number of rotation of the wheels 3 per unit time, that is, the velocity of the wheels 3.

The respective suspensions 31*a*, 31*b*, 31*c*, 31*d* provided at the corresponding right-and-left front wheels 3F, 3F and the corresponding right-and-left rear wheels 3R, 3R are referred to as a left front suspension 31*a*, a right front suspension 31*b*, a left rear suspension 31*c*, and a right rear suspension 31*d*, respectively. The respective suspensions 31*a*, 31*b*, 31*c*, 31*d* include corresponding shock absorbers 32*a*, 32*b*, 32*c*, 32*d* along with springs of the suspensions 31*a*, 31*b*, 31*c*, 31*d* to restrain the springs of the suspensions 31*a*, 31*b*, 31*c*, 31*d* from expanding. The suspensions 31*a*, 31*b*, 31*c*, 31*d* are collectively referred to as a suspension 31 while the shock absorbers 32*a*, 32*b*, 32*c*, 32*d* are collectively referred to as a shock absorber 32.

The shock absorber 32 is a damper stabilizing the vehicle body 2 by quickly decreasing the expansion and contraction of the spring of the suspension 31. According to the embodiment, the shock absorber 32 may control damping force and may be set with depression levels and release levels at which damping force corresponding to the levels is applied. The shock absorber 32 may be set with the multiple depression levels and the multiple release levels at which damping force from the largest damping force applied by the shock absorber 32 which is, for example, in the hardest state to the smallest damping force applied by the shock absorber 32 which is, for example, in the softest state may be applied to the shock absorber 32. That is, the harder the shock absorber 32 is, the greater, or the stronger damping force for restraining the spring of the suspension 31 from expanding and contracting is applied to the spring of the suspension 31.

For example, the damping force may be controlled by controlling, or regulating the amount of oil flowing into a cylinder of the shock absorber 32, however, is not limited to this and other methods may be applied.

The vehicle control device restrains the vehicle 1 from tilting forward, or diving caused by the depression of the brake pedal 6 by setting the depression level of the shock absorber 32. The dive state is a phenomenon that the load shift toward the front of the vehicle 1 tilts the front of the vehicle 1 downward while tilting the rear of the vehicle 1 upward. The shock absorber 32 may be set with the different depression levels of, a first depression level (serving as a first damping force) at which the largest damping force is applied to the suspension 31 using the shock absorber 32 which is, for example, in the hardest state, a second depression level (serving as a damping force that is greater than the reference damping force, the damping force that is smaller than the first damping force and the damping force that is based on the variation of the master cylinder pressure) at which damping force that is smaller than damping force corresponding to the first depression level, and that is adjusted, or controlled in response to the depression of the brake pedal 6 is applied to the suspension 31, and a third depression level at which the smallest damping force is applied to the suspension 31 using the shock absorber 32 which is, for example, in the softest state.

The vehicle control device restrains the vehicle 1 from swinging back from the tilting forward attitude caused by the release of the brake pedal 6 by setting the release level of the brake pedal 6. The shock absorber 32 may be set with the different release levels of, a first release level (serving as a second damping force) at which the largest damping force is applied to the suspension 31 using the shock absorber 32 which is, for example, in a hardest state, a second release level (serving as a damping force that is greater than the reference damping force to the suspension, the damping force that is smaller than the second damping force and the damping force that is based on the variation of the master cylinder pressure) at which damping force that is smaller than damping force corresponding to the first release level, and that is adjusted, or controlled in response to the release of the brake pedal 6 is applied to the suspension 31, and a third release level at which the smallest damping force is applied to the suspension 31 using the shock absorber 32 which is, for example, in a softest state.

As illustrated in FIG. 2, the ECU 14 mainly includes a determination portion 141, a control portion 142, a first timer 143, and a second timer 144. A central processing unit, or CPU reads a vehicle control program installed in a read only memory, or ROM and operates the vehicle control program to create the determination portion 141, the control portion 142, the first timer 143, and the second timer 144 on a random access memory, or RAM.

When the operator performs the braking operation by depressing the brake pedal 6, the vehicle 1 may be in the dive state. The control portion 142 controls the suspension 31 to restrain the vehicle 1 from diving, or tilting forward caused by the depression of the brake pedal 6 based on the variation of the master cylinder pressure detected by the master cylinder pressure sensor 28.

When the operator releases the brake pedal 6 from a state where the operator depresses the brake pedal 6, the vehicle 1, in motion or at rest, swings back from the dive state, and in some cases, the vehicle 1 squats. The squat state is a phenomenon that the front of the vehicle 1 tilts upward while the rear of the vehicle 1 tilts downward. The control portion 142 controls the suspension 31 to restrain the vehicle 1 from swinging back from the dive state caused by the release of the brake pedal 6, which is in a depressed state, based on the variation of the master cylinder pressure.

A pitching motion is caused by the load shift that makes the vehicle 1 in motion dive (tilt forward), or squat (tilt backward).

According to the embodiment, the vehicle control device restrains the vehicle 1 from pitching based on the variation of the master cylinder pressure and the velocity of the wheels 3. That is, according to the embodiment, the vehicle control device determines that the vehicle 1 dives caused by the depression of the brake pedal 6 based on the variation of the master cylinder pressure and the velocity of the wheels 3, and restrains the vehicle 1 from diving. Further, the vehicle control device determines that the vehicle 1 swings back from the dive state caused by the release of the brake pedal 6 based on the variation of the master cylinder pressure and the velocity of the wheels 3, and restrains the vehicle 1 from swinging back from the dive state.

Figure 4:
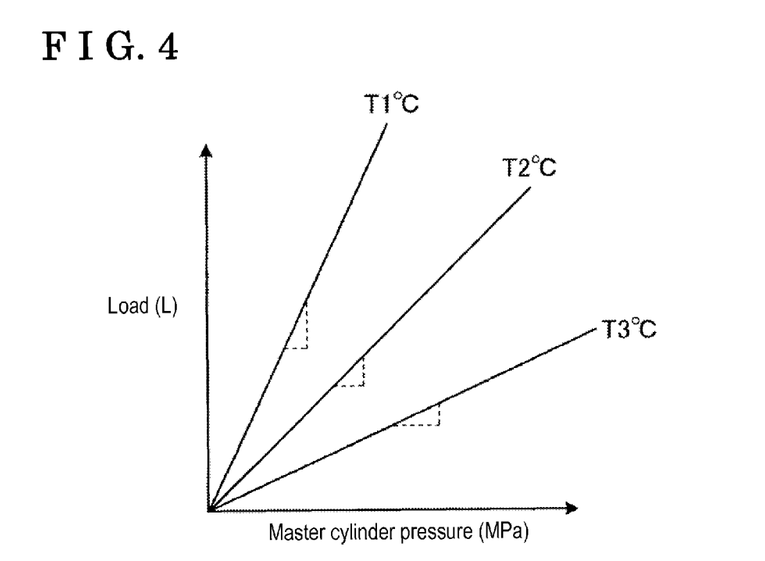
FIG. 4 is a graph illustrating a relationship between a master cylinder pressure in response to a braking operation and load applied to the vehicle.

In FIG. 4, a horizontal axis indicates the amount of the master cylinder pressure while a vertical axis indicates the size of the load. As illustrated in FIG. 4 the master cylinder pressure and the size of the load establish the proportional relationship including different slopes, or gradients as oil temperature changes (for example, T3>T2>T1). This is because the flow rate of brake oil changes as the temperature thereof changes. The load applied to rotate the vehicle 1 in an up-down direction, in other words, to tilt the vehicle 1 forward, with an axis in the right-left direction of the vehicle 1 may be determined based on the temperature of brake oil and the variation of the master cylinder pressure. In the embodiment, the temperature of brake oil will not be explained to simplify the explanations of the embodiment. According to the embodiment, the variation of the master cylinder pressure is an example that determines the load applied to rotate the vehicle 1 in the up-down direction, in other words, the generation of the pitching motion with the axis in the right-left direction of the vehicle 1. Hereinafter, the structure of the vehicle control device for restraining the vehicle 1 from pitching, or for controlling the pitching motion of the vehicle 1 will be explained in detail. As described above, according to the embodiment, the pitching motion of the vehicle will be determined based on the variation of the master cylinder pressure. Alternatively, the pitching motion may be determined based on the combination of the variation of the master cylinder pressure and the temperature of brake oil.

In FIG. 2, the control portion 142 sets the first timer 143 and the second timer 144 to measure time. According to the embodiment, when the control portion 142 sets the shock absorber 32 of the suspension 31 to the first depression level, in other words, when the operator performs a sudden braking operation, the first timer 143 sets time corresponding to the first depression level. When the control portion 142 sets the shock absorber 32 of the suspension 31 to the second depression level, in other words, when the operator performs a normal braking operation, the first timer 143 sets time corresponding to the second depression level. After the setting, the first timer 143 decrements and reaches zero after the predetermined time for each level elapses.

When the control portion 142 sets the shock absorber 32 of the suspension 31 to the first release level, the second timer 144 sets time corresponding to the first release level. When the control portion 142 sets the shock absorber 32 of the suspension 31 to the second release level, the second timer 144 sets time corresponding to the second release level. After the setting, the second timer 144 decrements and reaches zero after the predetermined time for each level elapses.

The determination portion 141 determines whether the velocity of the wheels 3 of the vehicle 1 detected using the wheel speed sensor 22 is higher than the predetermined threshold value of the velocity of the wheels 3 when the vehicle 1 swings back, or, the predetermined threshold value of the velocity of the wheels 3. The determination portion 141 further determines whether the variation of the master cylinder pressure detected using the master cylinder pressure sensor 28 is equal to or higher than a predetermined first threshold value or a first adjusted threshold value when the process for controlling the dive of the vehicle 1 is executed. The threshold value of the velocity of the wheels 3 is a predetermined threshold value of a wheel speed at which the vehicle 1 may, or possibly start the pitching motion.

In a case where the velocity of the wheels 3 is higher than the threshold value of the velocity of the wheels 3 and where the variation of the master cylinder pressure is equal to or higher than the first threshold value, the determination portion 141 determines that the load to tilt the vehicle 1 forward suddenly is applied to the vehicle 1 when the operator performs the sudden braking operation caused by the depression of the brake pedal 6.

The first adjusted threshold value is lower than the first threshold value. In a case where the velocity of the wheels 3 is higher than the threshold value of the velocity of the wheels 3 and where the variation of the master cylinder pressure is equal to or higher than the first adjusted threshold value and is lower than the first threshold value, the control portion 142 determines that the load to tilt the vehicle 1 forward is applied to the vehicle 1 when the operator performs the normal braking operation caused by the depression of the brake pedal 6.

The determination portion 141 determines whether the variation of the master cylinder pressure detected using the master cylinder pressure sensor 28 is equal to or lower than a predetermined second threshold value or a second adjusted threshold value when the process for controlling the swing back from the diving state of the vehicle 1 is executed.

In a case where the velocity of the wheels 3 is higher than the threshold value of the velocity of the wheels 3 and where the variation of the master cylinder pressure is equal to or lower than the second threshold value, the control portion 142 determines that the load to swing the vehicle 1 back from the dive state suddenly is applied to the vehicle 1 when the operator performs the sudden release of the brake pedal 6 from a state where the operator performs the braking operation caused by the depression of the brake pedal 6.

The second adjusted threshold value is higher than the second threshold value. In a case where the velocity of the wheels 3 is higher than the threshold value of the velocity of the wheels 3 and where the variation of the master cylinder pressure is equal to or lower than the second adjusted threshold value and is higher than the second threshold value, the control portion 142 determines that the load to swing the vehicle 1 back from the dive state is applied to the vehicle 1 when the operator performs the normal release of the brake pedal 6 from a state where the operator performs the braking operation caused by the depression of the brake pedal 6.

In a case where the determination portion 141 determines that the velocity of the wheels 3 of the vehicle 1 is higher than the threshold value of the velocity of the wheels 3 and that the variation of the master cylinder pressure is equal to or higher than the first threshold value, the vehicle 1 may suddenly tilt forward, or dive because the operator performs the sudden braking operation.

In such a case, the control portion 142 sets the shock absorber 32 of the suspension 31 to a depression level at which damping force corresponding to or in accordance with the sudden forward tilting movement of the vehicle 1, that is, corresponding to the level of the variation of the master cylinder pressure is applied to the suspension 31. Accordingly, the vehicle 1 is restrained from diving suddenly. According to the embodiment, the control portion 142 sets the large depression level to apply the greatest damping force corresponding to the sudden forward tilting movement of the vehicle 1 to the suspension 31.

However, in a case where the determination portion 141 determines that the velocity of the wheels 3 of the vehicle 1 is higher than the threshold value of the velocity of the wheels 3 and that the variation of the master cylinder pressure is equal to or higher than the first threshold value, the depression level is not limited to the first depression level, and may be a depression level at which damping force that is greater than reference damping force applied to the suspension 31 when the vehicle 1 is in normal motion, and that is large enough to restrain the vehicle 1 from diving suddenly is applied to the suspension 31.

In a case where the determination portion 141 determines that the velocity of the wheels 3 is higher than the threshold value of the velocity of the wheels 3 and that the variation of the master cylinder pressure is equal to or higher than the first adjusted threshold value and lower than the first threshold value, the control portion 142 sets the shock absorber 32 to the second depression level. The second depression level is a depression level at which damping force that is smaller than damping force corresponding to the first depression level, that is greater than reference damping force, and that corresponds to the forward tilting movement of the vehicle 1, that is, corresponding to, or in accordance with the variation of the master cylinder pressure is applied to the suspension 31. Accordingly, the vehicle 1 is restrained from diving.

The control portion 142 sets the shock absorber 32 to a depression level at which damping force smaller than reference damping force is applied to the suspension 31 after the predetermined time has elapsed, that is, the first timer 143 reaches zero from when the control portion 142 sets the first depression level to the shock absorber 32. According to the embodiment, the control portion 142 sets the third depression level to apply the lowest damping force to the suspension 31, however, is not limited to this and the control portion 142 may set a depression level at which lower damping force than reference damping force is applied to the suspension 31.

When the control portion 142 maintains the shock absorber 32 at the first depression level at which greater damping force than reference damping force is applied to the suspension 31, the vehicle 1 in motion cannot absorb vibrations, or oscillations due to rough roads using the suspension 31. Thus, after the predetermined time has elapsed from when the control portion 142 sets the shock absorber 32 to the first depression level, the control portion 142 sets the shock absorber 32 to a depression level at which lower damping force than reference damping force is applied to the suspension 31 to stabilize the vehicle 1.

In a case where the determination portion 141 determines that the velocity of the wheels 3 of the vehicle 1 is higher than the threshold value of the velocity of the wheels 3 and that the variation of the master cylinder pressure is equal to or lower than the second threshold value, the vehicle 1 may swing back from the dive state caused by the sudden release of the brake pedal 6 from the depression of the brake pedal 6.

In such a case, the control portion 142 sets the shock absorber 32 of the suspension 31 to the first release level. The first release level is a level at which damping force corresponding to the sudden swing back from the dive state of the vehicle 1, that is, corresponding to the level of the variation of the master cylinder pressure is applied to the suspension 31. Accordingly, the vehicle 1 is restrained from swinging back suddenly from the dive state. According to the embodiment, the control portion 142 sets the first depression level to apply the largest damping force in response to the sudden swing back from the dive state of the vehicle 1 to the suspension 31.

However, in a case where the determination portion 141 determines that the velocity of the wheels 3 of the vehicle 1 is higher than the threshold value of the velocity of the wheels 3 and that the variation of the master cylinder pressure is equal to or lower than the second threshold value, the depression level is not limited to the first depression level, and may be a depression level at which damping force that is greater than reference damping force and that is large enough to restrain the vehicle 1 from swinging back suddenly from the dive state is applied to the suspension 31.

In a case where the determination portion 141 determines that the variation of the master cylinder pressure is equal to or lower than the second adjusted threshold value and higher than the second threshold value, the control portion 142 sets the shock absorber 32 to the second release level. The second release level is a level at which damping force that is smaller than damping force corresponding to the first depression level, that is greater than reference damping force, and that corresponds to the swing back from the dive state of the vehicle 1, that is, that is based on the variation of the master cylinder pressure is applied to the suspension 31. Accordingly, the vehicle 1 is restrained from swinging back from the dive state.

After the predetermined time counted by the second timer 144 has elapsed from when the control portion 142 sets the shock absorber 32 to the first depression level, the control portion 142 sets the shock absorber 32 to a depression level at which damping force smaller than reference damping force is applied to the suspension 31. According to the embodiment, the control portion 142 sets the third release level to apply the lowest damping force to the suspension 31, however, is not limited to this and the control portion 142 may set a release level at which lower damping force than reference damping force is applied to the suspension 31.

When the control portion 142 maintains the shock absorber 32 to the first release level at which greater damping force than reference damping force is applied to the suspension 31, the vehicle 1 in motion cannot absorb vibrations, or oscillations due to rough roads using the suspension 31. Thus, after the predetermined time has elapsed from when the control portion 142 sets the shock absorber 32 to the first release level, the control portion 142 sets the shock absorber 32 to a release level at which lower damping force than reference damping force is applied to the suspension 31 to stabilize the vehicle 1.

Figure 5:
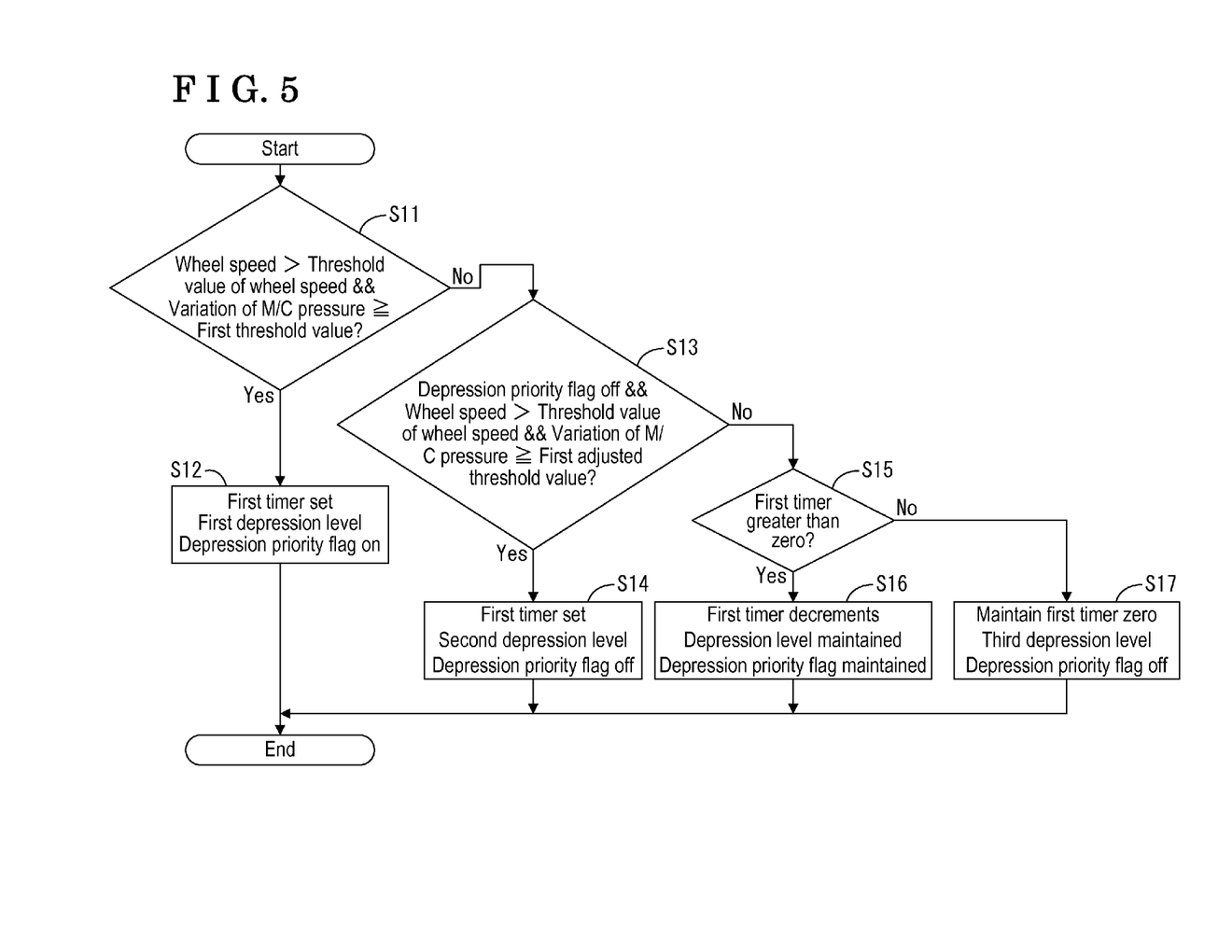
FIG. 5 is a flowchart showing a process for controlling the dive of the vehicle according to the embodiment.

Next, the process for controlling the pitching motion of the vehicle 1 by the vehicle control device of the embodiment configured as above will be explained. The master cylinder pressure is referred to as M/C pressure in FIGS. 5, 6, 9 and 10. As illustrated in FIG. 5, the process for controlling the vehicle 1 to restrain the diving state is executed repeatedly for each period of time. When the vehicle 1 starts, a depression priority flag is off as default. The depression priority flag is set on when the operator depresses the brake pedal 6 in the sudden braking operation.

The determination portion 141 determines whether the velocity of the wheels 3 of the vehicle 1 detected using the wheel speed sensor 22 is higher than the predetermined threshold value of the velocity of the wheels 3, and whether the variation of the master cylinder pressure is higher than a predetermined first threshold value (Step S11). In a state where the velocity of the wheels 3 of the vehicle 1 is higher than the predetermined threshold value of the velocity of the wheels 3, and where the variation of the master cylinder pressure is higher than the predetermined first threshold value (Yes in Step S11), the control portion 142 determines that the load to tilt the vehicle 1 forward suddenly is applied to the vehicle 1 when the operator depresses the brake pedal 6 in the sudden braking operation. Then, the control portion 142 sets the shock absorber 32 to the first depression level. The first depression level is a level at which damping force corresponding to the sudden dive or forward tilting movement of the vehicle 1, that is, damping force corresponding to the variation of the master cylinder pressure is applied to the suspension 31. Along with that, the control portion 142 sets the first timer 143 to start measuring time, and sets the depression priority flag on (Step S12). Accordingly, the vehicle 1 is restrained from diving suddenly.

When the depression priority flag is on by the depression of the brake pedal 6 in the sudden braking operation, the control portion 142 does not determine that the operator depresses the brake pedal 6 in the normal braking operation (No in Step S13), and determines whether the predetermined time has elapsed from when the control portion 142 sets the shock absorber 32 to the first depression level caused by the sudden braking operation in Step S15.

In a case where the velocity of the wheels 3 is equal to or lower than the threshold value of the velocity of the wheels 3 or where the variation of the master cylinder pressure is lower than the first threshold value (No in Step S11), the determination portion 141 determines whether the depression priority flag is off, whether the velocity of the wheels 3 is higher than the threshold value of the velocity of the wheels 3, and whether the variation of the master cylinder pressure is equal to or higher than the first adjusted threshold value. (Step S13).

In a case where the depression priority flag is off, where the velocity of the wheels 3 is higher than the threshold value of the velocity of the wheels 3, and where the variation of the master cylinder pressure is equal to or is higher than the first adjusted threshold value (Yes in Step S13), the control portion 142 determines that the load to tilt the vehicle 1 forward is applied to the vehicle 1 when the operator depresses the brake pedal 6 in the normal braking operation. Then, the control portion 142 sets the shock absorber 32 to the second depression level. The second depression level is a level at which damping force that is smaller than greater damping force corresponding to the first depression level, damping force that is greater than reference damping force, and damping force that is great enough to correspond to the forward tilting movement of the vehicle 1, that is, enough to correspond to the variation of the master cylinder pressure is applied to the suspension 31. Along with that, the control portion 142 sets the first timer 143 to start measuring time, and sets the depression priority flag off (Step S14). Accordingly, the vehicle 1 is restrained from diving.

In a case where the depression priority flag is on, where the velocity of the wheels 3 is equal to or lower than the threshold value of the velocity of the wheels 3, or where the variation of the master cylinder pressure is lower than the first adjusted threshold value (No in Step S13), the determination portion 141 determines whether the predetermined time has elapsed by determining whether the first timer 143 counts greater than zero (Step S15).

In a case where the first timer 143 counts greater than zero, that is, in a case where the predetermined time has not elapsed (Yes in Step S15), the control portion 142 decrements the first timer 143 and maintains the depression level of the shock absorber 32 and the depression priority flag (Step S16).

On the other hand, in a case where the first timer 143 reaches zero, that is, in a case where the predetermined time has elapsed (No in Step S15), the control portion 142 maintains the first timer 143 zero, sets the shock absorber 32 to the third depression level at which smaller damping force than reference damping force is applied to the suspension 31, and sets the depression priority flag off (Step S17).

The steps from Step S11 to Step S17 are repeated for each period of time. In a case where the vehicle 1 is restrained from diving caused by the sudden braking operation in Step S12, the control portion 142 sets the depression priority flag on. Thus, when another process for controlling the dive state of the vehicle 1 is executed after setting the depression priority flag on, the step proceeds through Step S11, Step S13, and Step S15. Then, Step S17 is executed after the predetermined time has elapsed, and the control portion 142 sets the shock absorber 32 to the third depression level.

Figure 6:
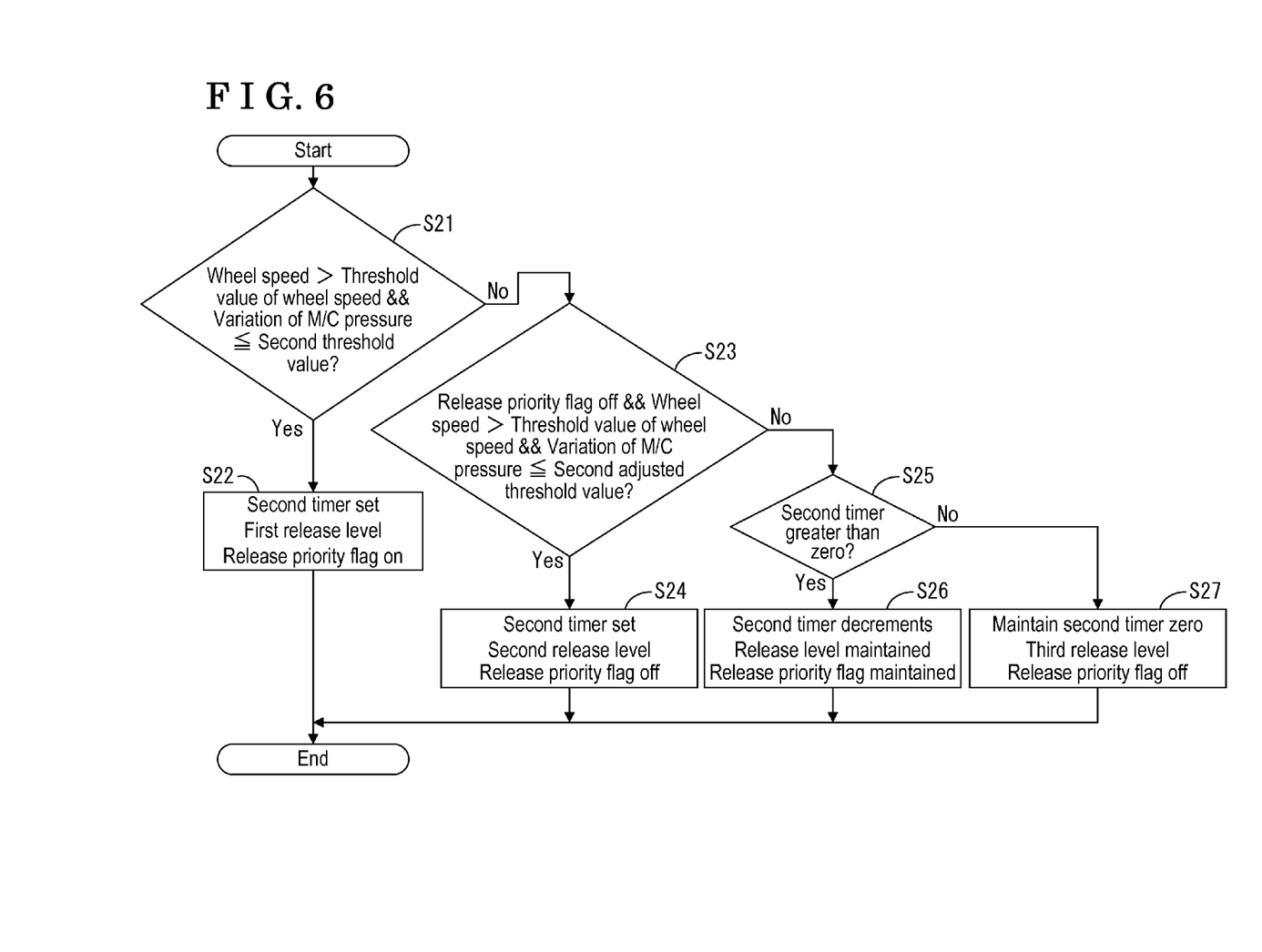
FIG. 6 is a flowchart showing a process for controlling the swing back from the dive of the vehicle according to the embodiment.

Next, the process for controlling the swing back from the dive of the vehicle 1 will be explained. As illustrated in FIG. 6, the process for controlling the swing back from the dive of the vehicle 1 is executed repeatedly for each period of time. FIG. 6 shows the process which, for example, starts after the process for controlling the dive of the vehicle 1 is executed as shown in FIG. 5. When the vehicle 1 starts, the depression priority flag is off as default.

The determination portion 141 determines whether the velocity of the wheels 3 of the vehicle 1 detected using the wheel speed sensor 22 is higher than the predetermined threshold value of the velocity of the wheels 3, and whether the variation of the master cylinder pressure is equal to or lower than a predetermined second threshold value (Step S21). In a case where the velocity of the wheels 3 of the vehicle 1 detected using the wheel speed sensor 22 is higher than the predetermined threshold value of the velocity of the wheels 3, and where the variation of the master cylinder pressure is equal to or lower than the predetermined second threshold value (Yes in Step S21), the control portion 142 determines that the load to swing the vehicle 1 back suddenly from the dive state is applied to the vehicle 1. Then, the control portion 142 sets the shock absorber 32 to a first release level. The first release level is a level at which damping force corresponding to the sudden swing back from the dive state of the vehicle 1, that is, damping force corresponding to the variation of the master cylinder pressure is applied to the suspension 31. Along with that, the control portion 142 sets the second timer 144 to start measuring time, and sets a release priority flag on (Step S22). The release priority flag is a flag that is set on when the operator releases the brake pedal 6 suddenly. Accordingly, the vehicle 1 is restrained from swinging back from the dive state suddenly.

When the release priority flag is on by the release of the brake pedal in the sudden release operation, the control portion 142 does not determine that the operator releases the brake pedal 6 in the normal release operation and determines whether the predetermined time has elapsed from when the control portion 142 sets the shock absorber 32 to the first release level caused by the sudden release operation of the brake pedal 6.

In a case where the velocity of the wheels 3 is equal to or lower than the threshold value of the velocity of the wheels 3, or where the variation of the master cylinder pressure is higher than the second threshold value (No in Step S21), the determination portion 141 determines whether the release priority flag is off, whether the velocity of the wheels 3 is higher than the threshold value of the velocity of the wheels 3, and whether the variation of the master cylinder pressure is equal to or lower than the second adjusted threshold value. (Step S23).

In a case where the release priority flag is off, where the velocity of the wheels 3 is higher than the threshold value of the velocity of the wheels 3, and where the variation of the master cylinder pressure is equal to or lower than the second adjusted threshold value (Yes in Step S23), the control portion 142 determines that the load to swing the vehicle 1 back from the dive state is applied to the vehicle 1. Then, the control portion 142 sets the shock absorber 32 to the second release level. The second release level is a level at which damping force that is smaller than damping force corresponding to the first release level, damping force that is greater than the reference damping force, and damping force that corresponds to the swing back of the vehicle 1 from the dive state, that is, damping force that corresponds to the variation of the master cylinder pressure is applied to the suspension 31. Along with that, the control portion 142 sets the second timer 144 to start measuring time, and sets the release priority flag off (Step S24). Accordingly, the vehicle 1 is restrained from swinging back from the dive state.

In a case where the release priority flag is on, where the velocity of the wheels 3 is equal to or lower than the threshold value of the velocity of the wheels 3, or where the variation of the master cylinder pressure is higher than the second adjusted threshold value (No in Step S23), the determination portion 141 determines whether the predetermined time has elapsed by determining whether the second timer 144 counts greater than zero (Step S25).

In a case where the second timer 144 counts greater than zero, that is, in a case where the predetermined time has not elapsed (Yes in Step S25), the control portion 142 decrements the second timer 144 and maintains the release level of the shock absorber 32 and the release priority flag (Step S26).

On the other hand, in a case where the second timer 144 reaches zero, that is, in a case where the predetermined time has elapsed (No in Step S25), the control portion 142 maintains the second timer 144 zero, sets the shock absorber 32 to the third release level at which smaller damping force than reference damping force is applied to the suspension 31, and sets the release priority flag off (Step S27).

The steps from Step S21 to Step S27 are repeated for each period of time. In a case where the vehicle 1 is restrained from swinging back from the dive state suddenly in Step S22, the control portion 142 sets the release priority flag on. Thus, when another process for controlling the swing back from the dive state of the vehicle 1 is executed after setting the release priority flag on, the step proceeds through Step S21, Step S23 and Step S25. Then, Step S27 is executed after the predetermined time has elapsed, and the control portion 142 sets the shock absorber 32 to the third release level.

Figure 7:
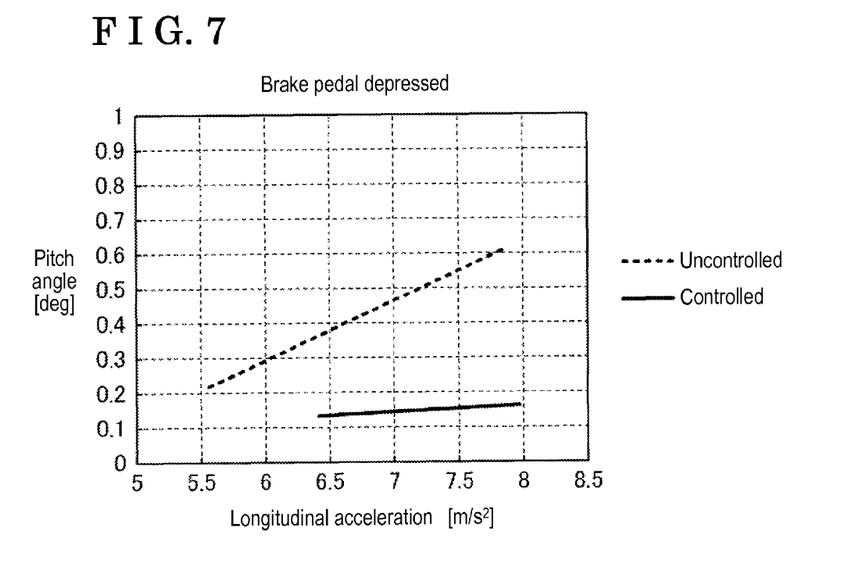
FIG. 7 is a graph illustrating a relationship between a longitudinal acceleration and a pitch angle of the vehicle when the brake pedal is depressed.

In FIG. 7, a horizontal axis indicates a longitudinal acceleration of the vehicle 1 while a vertical axis indicates a pitch angle, that is, an angle in a pitch direction, of the vehicle 1. In FIG. 7, a dotted line shows a relationship between the longitudinal acceleration of the vehicle 1 and the pitch angle of the vehicle 1 when the vehicle 1 does not operate the diving control while a solid line shows a relationship between the longitudinal acceleration of the vehicle 1 and the pitch angle of the vehicle 1 when the vehicle operates the diving control. As illustrated in FIG. 7, in a case where the vehicle 1 does not operate the diving control, the pitch angle of the vehicle 1 increases in a case where the longitudinal acceleration of the vehicle 1 increases by the depression of the brake pedal 6. Accordingly, the vehicle 1 dives in a large way. On the other hand, as illustrated in FIG. 7, in a case where the vehicle 1 operates the diving control, the pitch angle of the vehicle 1 less increases even in a state where the longitudinal acceleration of the vehicle 1 increases by the depression of the brake pedal 6. Accordingly, the stability of the vehicle 1 is maintained.

Figure 8:
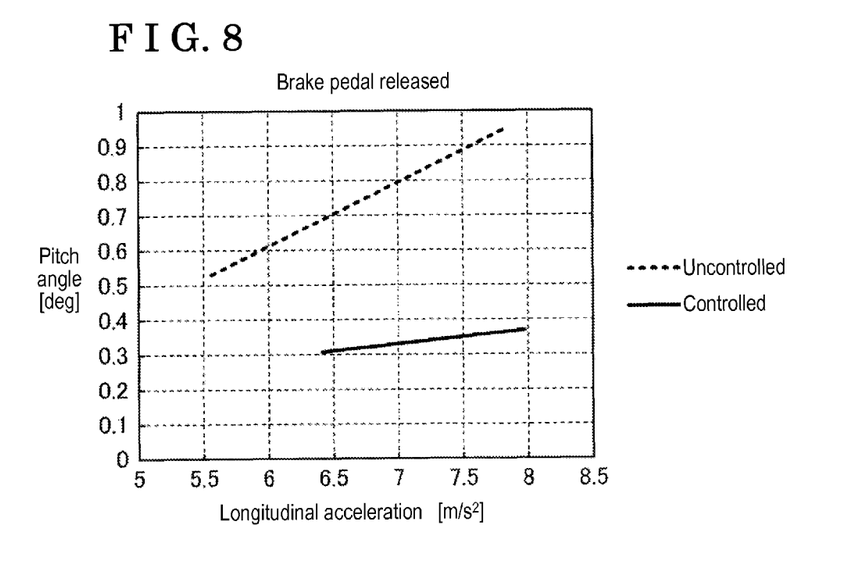
FIG. 8 is a graph illustrating a relationship between the longitudinal acceleration and the pitch angle of the vehicle when the brake pedal is released.

In FIG. 8, a horizontal axis indicates a longitudinal acceleration of the vehicle 1 while a vertical axis indicates a pitch angle of the vehicle 1. In FIG. 8, a dotted line shows a relationship between the longitudinal acceleration of the vehicle 1 and the pitch angle of the vehicle 1 when the vehicle 1 does not operate the swinging back control from the dive state while a solid line shows a relationship between the longitudinal acceleration of the vehicle 1 and the pitch angle of the vehicle 1 when the vehicle 1 operates the swing back control from the dive state. As illustrated in FIG. 8, when the vehicle 1 does not operate the swing back control, the pitching angle of the vehicle 1 increases in a case where the longitudinal acceleration of the vehicle 1 increases by the release of the brake pedal 6. Accordingly, the vehicle 1 swings back from the dive state in a large way. On the other hand, as illustrated in FIG. 8, when the vehicle 1 operates the swing back control, the pitching angle of the vehicle less increases even in a state where the longitudinal acceleration of the vehicle 1 increases by the depression of the brake pedal 6. Accordingly, the stability of the vehicle 1 is maintained.

According to the embodiment, the vehicle 1 operates both the diving control when the operator depresses the brake pedal 6 and the swing back control from the dive state when the operator releases the brake pedal 6. Because the vehicle 1 effectively controls the diving control and the swinging back control from the dive state to stabilize the vehicle, the riding comfort for the operator increases.

According to the embodiment, the determination portion 141 determines whether the load is applied to the vehicle 1 caused by the depression/release of the brake pedal 6 using the variation of the master cylinder pressure. Thus, the vehicle 1 does not have to include various sensors and may be simply configured by reducing the number of the sensors.

In the embodiment, the determination portion 141 determines whether the operator depresses or releases the brake pedal 6 based on the variation of the master cylinder pressure. Additionally, in a modified example of the embodiment, the determination portion 141 may be configured to determine whether the operator depresses or releases the brake pedal 6 by the amount of the master cylinder pressure.

Figure 9:
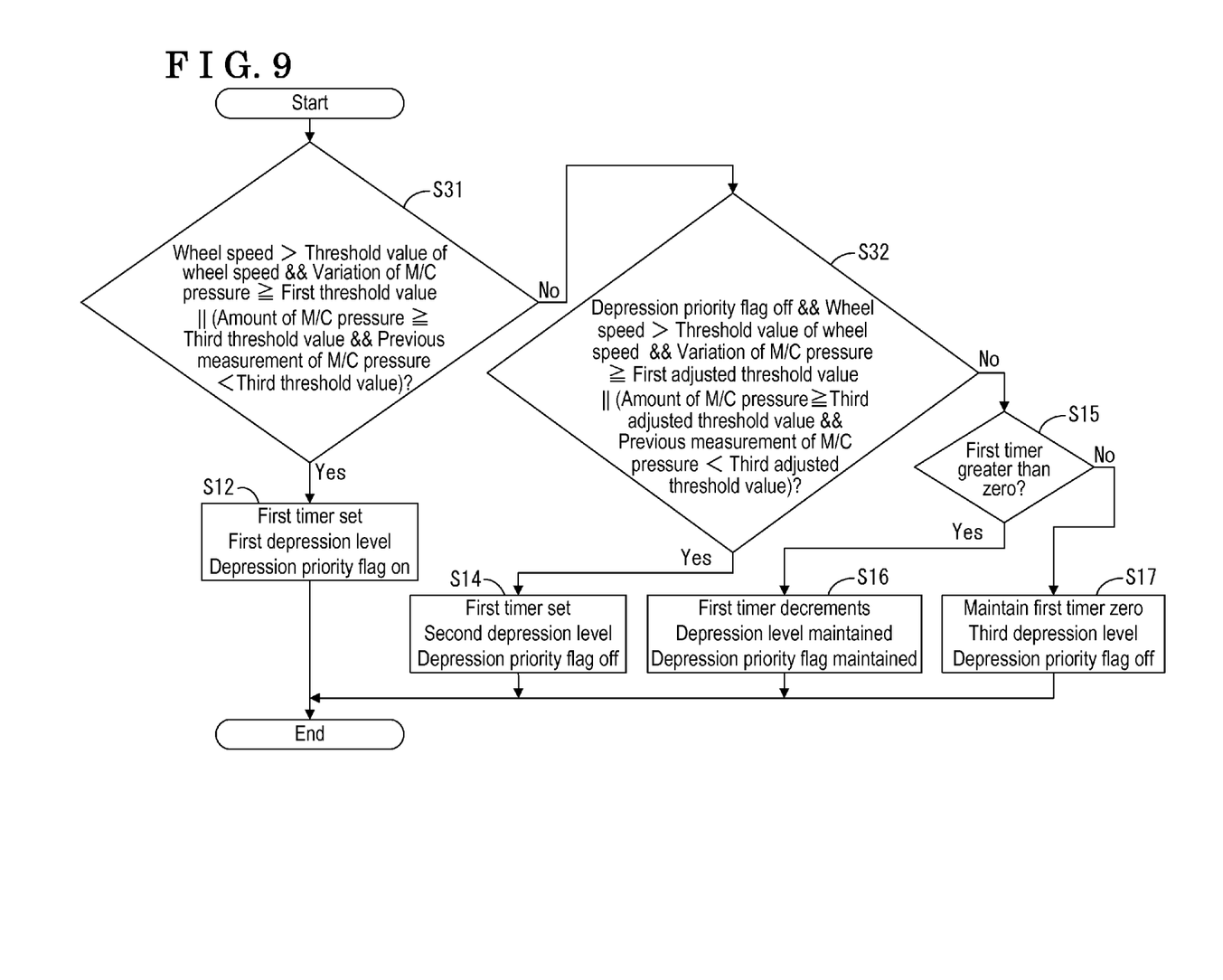
FIG. 9 is a flowchart showing a process for controlling the dive of the vehicle according to a modified example of the embodiment.

According to the modified example of the embodiment illustrated in FIG. 9, Step S31 corresponds to Step S11 of the embodiment in the process for controlling the dive state of the vehicle 1. In Step S31, the determination portion 141 determines whether the velocity of the wheels 3 of the vehicle 1 detected using the wheel speed sensor 22 is higher than the predetermined threshold value of the velocity of the wheels 3, and whether the variation of the master cylinder pressure is equal to or higher than a predetermined first threshold value. Alternatively, the determination portion 141 determines that the master cylinder pressure is equal to or higher than a third threshold value and whether the previous measurement of a master cylinder pressure is lower than the third threshold value (Step S31).

In a case where the velocity of the wheels 3 of the vehicle 1 is higher than the predetermined threshold value of the velocity of the wheels 3, and where the variation of the master cylinder pressure is equal to or higher than the first threshold value, the control portion 142 determines that the load to the vehicle 1 to tilt forward suddenly is applied by the depression of the brake pedal 6 in the sudden braking operation. Alternatively, in a case where the master cylinder pressure is equal to or higher than the third threshold value and whether the previous measurement of a master cylinder pressure is lower than the third threshold value, (Yes in Step S31), the control portion 142 determines that the load to the vehicle 1 to tilt forward suddenly is applied by the depression of the brake pedal 6 in the sudden braking operation. Accordingly, same as the embodiment, the control portion 142 sets the first timer 143 to start measuring time, sets the shock absorber 32 to the first release level at which damping force corresponding to the sudden diving movement of the vehicle 1, that is, corresponding to the variation of the master cylinder pressure is applied to the suspension 31, and sets the depression priority flag on (Step S12).

According to the modified example of the embodiment, Step S32 corresponds to Step S13 of the embodiment in the process for controlling the dive state of the vehicle 1. In Step S32, the determination portion 141 determines whether the depression priority flag is off, whether the velocity of the wheels 3 is higher than the threshold value of the velocity of the wheels 3, and whether the variation of the master cylinder pressure is equal to or higher than the first adjusted threshold value. Alternatively, the determination portion 141 determines whether the master cylinder pressure is equal to or higher than a third adjusted threshold value which is lower than the third threshold value, and whether the previous measurement of a master cylinder pressure is lower than the third adjusted threshold value (Step S32).

In a case where the depression priority flag is off, where the velocity of the wheels 3 is higher than the threshold value of the velocity of the wheels 3, and where the variation of the master cylinder pressure is equal to or higher than the first threshold value, the control portion 142 determines that the load to tilt the vehicle 1 forward is applied to the vehicle 1 when the operator depresses the brake pedal 6 in the normal braking operation. Alternatively, in a case where the master cylinder pressure is equal to or is higher than the third adjusted threshold value, and where the previous measurement of a master cylinder pressure is lower than the third adjusted threshold value (Yes in Step S32), the control portion 142 determines that the load to tilt the vehicle 1 forward is applied to the vehicle 1 when the operator depresses the brake pedal 6 in the normal braking operation. Accordingly, the control portion 142, same as the embodiment, sets the first timer 143 to start measuring time, sets the shock absorber 32 to the second depression level at which damping force that is smaller than damping force corresponding to the first depression level, that is greater than reference damping force, and that corresponds to the variation of the master cylinder pressure is applied to the suspension 31, and sets the depression priority flag off (Step S14).

The process for controlling the dive state of the vehicle 1 other than Step S31 and Step S32 is the same as the embodiment of the disclosure.

Figure 10:
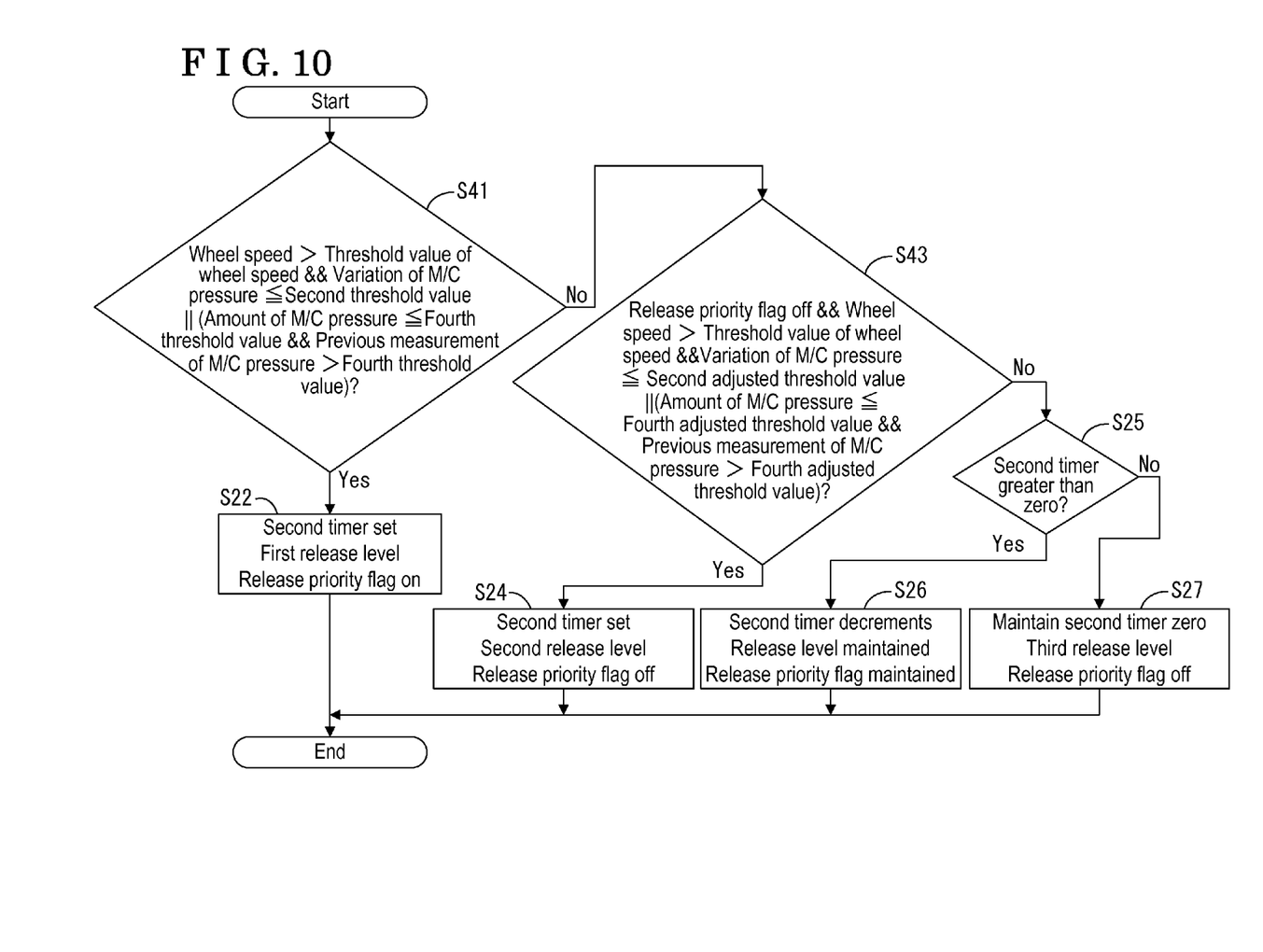
FIG. 10 is a flowchart showing a process for controlling the swing back from the dive of the vehicle according to the modified example of the embodiment.

According to the modified example of the embodiment illustrated in FIG. 10, Step S41 corresponds to Step S21 of the embodiment in the process for controlling the swing back from the dive state of the vehicle 1. In Step S41, the determination portion 141 determines whether the velocity of the wheels 3 of the vehicle 1 is higher than the threshold value of the velocity of the wheels 3, and whether the variation of the master cylinder pressure is equal to or lower than the second threshold value. Alternatively, the determination portion 141 determines whether the master cylinder pressure is equal to or lower than a fourth threshold value and whether the previous measurement of a master cylinder pressure is higher than the fourth threshold value (Step S41).

In a case where the velocity of the wheels 3 is higher than the threshold value of the velocity of the wheels 3 and where the variation of the master cylinder pressure is equal to or lower than the second threshold value, the control portion 142 determines that the load to suddenly swing back from the dive state is applied to the vehicle 1. Alternatively, in a case where the master cylinder pressure is equal to or lower than the fourth threshold value and where the previous measurement of a master cylinder pressure is higher than the fourth threshold value (Yes in Step S41), the control portion 142 determines that the load to suddenly swing back from the dive state is applied to the vehicle 1. Same as the embodiment, the control portion 142 sets the second timer 144 to start measuring time, sets the shock absorber 32 to the first release level at which damping force corresponding to the sudden swing back from the dive state, that is, corresponding to the variation of the master cylinder pressure is applied to the suspension 31, and sets the release priority flag on (Step S22).

According to the modified example of the embodiment, Step S43 corresponds to Step S23 of the embodiment in the process for controlling of the swing back from the dive state of the vehicle 1. In Step S43, the determination portion 141 determines whether the release priority flag is off, whether the velocity of the wheels 3 is higher than the threshold value of the velocity of the wheels 3, and whether the variation of the master cylinder pressure is equal to or lower than the second adjusted threshold value. Alternatively, the determination portion 141 determines whether the master cylinder pressure is equal to or lower than a fourth adjusted threshold value which is higher than the fourth threshold value, and whether the previous measurement of a master cylinder pressure is higher than the fourth adjusted threshold value (Step S43).

In a state where the release priority flag is off, where the velocity of the wheels 3 is higher than the threshold value of the velocity of the wheels 3, and where the variation of the master cylinder pressure is equal to or lower than the second adjusted threshold value, the control portion 142 determines that the load to swing the vehicle 1 back from the dive state is applied to the vehicle 1. Alternatively, in a case where the master cylinder pressure is equal to or lower than the fourth adjusted threshold value, and whether the previous measurement of a master cylinder pressure is higher than the fourth adjusted threshold value (Yes in Step S43), the control portion 142 determines that the load to swing the vehicle 1 back from the dive state is applied to the vehicle 1. Accordingly, the control portion 142 sets the second timer 144 to start measuring time, sets the shock absorber 32 to the second release level at which damping force that is smaller than damping force corresponding to the first release level, that is greater than reference damping force, and that corresponds to the swing back from the dive state of the vehicle 1, that is, corresponds to the variation of the master cylinder pressure is applied to the suspension 31, and sets the release priority flag off (Step S24).

The process for controlling the swing back from the dive state of the vehicle 1 other than Step S41 and Step S43 is the same as the embodiment of the disclosure.

According to the modified example of the embodiment, the determination portion 141 may determine whether the load is applied to the vehicle 1 caused by the depression and the release of the brake pedal 6 by the amount of the master cylinder pressure other than the variation of the master cylinder pressure. Accordingly, the vehicle 1 efficiently and precisely controls the dive state and the swing back from the dive state to maintain the stability of the vehicle 1. Thus, the riding comfort for the operator increases while reducing the number of the sensors to simplify the configuration of the vehicle control device.

According to the aforementioned embodiment, the vehicle control device includes the detection portion (master cylinder pressure sensor 28) detecting the master cylinder pressure which is oil pressure applied by the master cylinder changing the depression force applied to the brake pedal 6 into oil pressure and the control portion 142 controlling the suspension 31 to restrain the vehicle 1 from tilting forward caused by the depression of the brake pedal 6 based on the variation of the master cylinder pressure, the control portion 142 controlling the suspension 31 to restrain the vehicle from swinging back from the tilting forward attitude caused by the release of the brake pedal 6 based on the variation of the master cylinder pressure.

According to the aforementioned configuration, for example, the vehicle control device increases the stability of the vehicle 1 while reducing the number of the sensors to simplify the configuration of the vehicle control device.

According to the aforementioned embodiment, the vehicle control device further includes the determination portion 141 determining whether the velocity of the wheel 3 of the vehicle 1 is higher than the predetermined threshold value of the velocity of the wheel 3, and whether the variation of the master cylinder pressure is equal to or higher than the predetermined first threshold value. The control portion 142 controls the suspension 31 to restrain the vehicle 1 from tilting forward by applying the first damping force (first depression level) that is greater than the reference damping force applied when the vehicle 1 is in the normal operation to the suspension 31, and the first damping force (first depression level)

that is based on the variation of the master cylinder pressure to the suspension 31 in a state where the determination portion 141 determines that the velocity of the wheel 3 of the vehicle 1 is higher than the predetermined threshold value of the velocity of the wheel 3, and that the variation of the master cylinder pressure is equal to or higher than the predetermined first threshold value.

According to the aforementioned configuration, for example, the vehicle control device increases the stability of the vehicle 1 in the sudden braking operation.

According to the aforementioned embodiment, the determination portion 141 determines whether the variation of the master cylinder pressure is equal to or higher than the first adjusted threshold value which is lower than the first threshold value, and the control portion 142 controls the suspension 31 to restrain the vehicle 1 from tilting forward by applying the damping force (second depression level) that is greater than the reference damping force to the suspension 31, the damping force (second depression level) that is smaller than the first damping force to the suspension 31 and the damping force (second depression level) that is based on the variation of the master cylinder pressure to the suspension 31 in a state where the determination portion 141 determines that the velocity of the wheel 3 of the vehicle 1 is higher than the predetermined threshold value of the velocity of the wheel 3, and that the variation of the master cylinder pressure is equal to or higher than the first adjusted threshold value and lower than the first threshold value.

According to the aforementioned configuration, for example, the vehicle control device increases the stability of the vehicle 1 in the braking operation.

According to the aforementioned embodiment, the control portion 142 applies the smaller damping force than the reference damping force to the suspension 31 after the predetermined time elapses from when the control portion 142 applies the first damping force to the suspension 31.

According to the aforementioned configuration, for example, the vehicle control device restrains the vehicle 1 from tilting forward in the sudden braking operation while absorbing the vibrations, or oscillations caused by rough roads. Accordingly, the vehicle control device maintains the stability of the vehicle 1.

According to the aforementioned embodiment, the determination portion 141 determines whether the variation of the master cylinder pressure is equal to or lower than the second threshold value, and the control portion 142 controls the suspension 31 to restrain the vehicle 1 from swinging back from the tilting forward attitude by applying the second damping force (first release level) that is greater than the reference damping force applied when the vehicle 1 is in the normal operation to the suspension 31, and the second damping force that is based on the variation of the master cylinder pressure to the suspension 31 in a state where the determination portion 141 determines that the velocity of the wheel 3 of the vehicle 1 is higher than the predetermined threshold value of the velocity of the wheel 3, and that the variation of the master cylinder pressure is equal to or lower than the second threshold value.

According to the aforementioned configuration, for example, the vehicle control device increases the stability of the vehicle 1 when the operator suddenly releases the brake pedal 6 in the sudden braking operation.

According to the aforementioned embodiment, the determination portion 141 determines whether the variation of the master cylinder pressure is equal to or lower than the second adjusted threshold value which is higher than the second threshold value, and the control portion 142 controls the suspension 31 to restrain the vehicle 1 from swinging back from tilting forward by applying the damping force (second release revel) that is greater than the reference damping force to the suspension 31, the damping force (second release revel) that is smaller than the second damping force to the suspension 31, and the damping force (second release revel) that is based on the variation of the master cylinder pressure to the suspension 31 in a state where the determination portion 141 determines that the variation of the master cylinder pressure is equal to or lower than the second adjusted threshold value and higher than the second threshold value.

According to the aforementioned configuration, for example, the vehicle control device increases the stability of the vehicle 1 when the operator releases the brake pedal 6 in the braking operation.

According to the aforementioned embodiment, the control portion 142 applies the smaller damping force than the reference damping force to the suspension 31 after the predetermined time elapses from when the control portion 142 applies the second damping force to the suspension 31.

According to the aforementioned configuration, for example, the vehicle control device restrains the vehicle 1 from swinging back from tilting forward attitude when the brake operating portion 6 is suddenly released while absorbing the vibrations, or oscillations caused by rough roads. Accordingly, the vehicle control device maintains the stability of the vehicle 1.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle control device, comprising:
    a detection portion detecting a master cylinder pressure which is an oil pressure applied by a master cylinder changing a depression force applied to a brake pedal into the oil pressure; and
    a control portion controlling a suspension to restrain a vehicle from tilting forward caused by a depression of the brake pedal based on a variation of the master cylinder pressure, the control portion controlling the suspension to restrain the vehicle from swinging back from a tilting forward attitude caused by a release of the brake pedal from a depressed state of the brake pedal based on the variation of the master cylinder pressure.

2. The vehicle control device according to claim 1, further comprising:
    a determination portion determining whether a velocity of the wheel of the vehicle is higher than a predetermined threshold value of the velocity of the wheel, and whether the variation of the master cylinder pressure is equal to or higher than a predetermined first threshold value; wherein
    the control portion controls the suspension to restrain the vehicle from tilting forward by applying a first damping force that is greater than a reference damping force applied when the vehicle is in a normal operation to the suspension, and the first damping force that is based on the variation of the master cylinder pressure to the suspension in a state where the determination portion determines that the velocity of the wheel of the vehicle is higher than the predetermined threshold value of the velocity of the wheel, and that the variation of the master cylinder pressure is equal to or higher than the predetermined first threshold value.

3. The vehicle control device according to claim 2, wherein the determination portion determines whether the variation of the master cylinder pressure is equal to or higher than a first adjusted threshold value which is lower than the first threshold value, the control portion controls the suspension to restrain the vehicle from tilting forward by applying a damping force that is greater than the reference damping force to the suspension, the damping force that is smaller than the first damping force to the suspension and the damping force that is based on the variation of the master cylinder pressure to the suspension in a state where the determination portion determines that the velocity of the wheel of the vehicle is higher than the predetermined threshold value of the velocity of the wheel, and that the variation of the master cylinder pressure is equal to or higher than the first adjusted threshold value and lower than the first threshold value.

4. The vehicle control device according to claim 2, wherein the control portion applies a smaller damping force than the reference damping force to the suspension after a predetermined time elapses from when the control portion applies the first damping force to the suspension.

5. The vehicle control device according to claim 3, wherein the control portion applies a smaller damping force than the reference damping force to the suspension after a predetermined time elapses from when the control portion applies the first damping force to the suspension.

6. The vehicle control device according to claim 2, wherein the determination portion determines whether the variation of the master cylinder pressure is equal to or lower than a second threshold value, and the control portion controls the suspension to restrain the vehicle from swinging back from the tilting forward attitude by applying a second damping force that is greater than the reference damping force applied when the vehicle is in the normal operation to the suspension, and the second damping force that is based on the variation of the master cylinder pressure to the suspension in a state where the determination portion determines that the velocity of the wheel of the vehicle is higher than the predetermined threshold value of the velocity of the wheel, and that the variation of the master cylinder pressure is equal to or lower than the second threshold value.

7. The vehicle control device according to claim 3, wherein the determination portion determines whether the variation of the master cylinder pressure is equal to or lower than a second threshold value, and the control portion controls the suspension to restrain the vehicle from swinging back from the tilting forward attitude by applying a second damping force that is greater than the reference damping force applied when the vehicle is in the normal operation to the suspension, and the second damping force that is based on the variation of the master cylinder pressure to the suspension in a state where the determination portion determines that the velocity of the wheel of the vehicle is higher than the predetermined threshold value of the velocity of the wheel, and that the variation of the master cylinder pressure is equal to or lower than the second threshold value.

8. The vehicle control device according to claim 4, wherein the determination portion determines whether the variation of the master cylinder pressure is equal to or lower than a second threshold value, and the control portion controls the suspension to restrain the vehicle from swinging back from the tilting forward attitude by applying a second damping force that is greater than the reference damping force applied when the vehicle is in the normal operation to the suspension, and the second damping force that is based on the variation of the master cylinder pressure to the suspension in a state where the determination portion determines that the velocity of the wheel of the vehicle is higher than the predetermined threshold value of the velocity of the wheel, and that the variation of the master cylinder pressure is equal to or lower than the second threshold value.

9. The vehicle control device according to claim 5, wherein the determination portion determines whether the variation of the master cylinder pressure is equal to or lower than a second threshold value, and the control portion controls the suspension to restrain the vehicle from swinging back from the tilting forward attitude by applying a second damping force that is greater than the reference damping force applied when the vehicle is in the normal operation to the suspension, and the second damping force that is based on the variation of the master cylinder pressure to the suspension in a state where the determination portion determines that the velocity of the wheel of the vehicle is higher than the predetermined threshold value of the velocity of the wheel, and that the variation of the master cylinder pressure is equal to or lower than the second threshold value.

10. The vehicle control device according to claim 6, wherein the determination portion determines whether the variation of the master cylinder pressure is equal to or lower than a second adjusted threshold value which is higher than the second threshold value, the control portion controls the suspension to restrain the vehicle from swinging back from tilting forward by applying a damping force that is greater than the reference damping force to the suspension, the damping force that is smaller than the second damping force to the suspension, and the damping force that is based on the variation of the master cylinder pressure to the suspension in a state where the determination portion determines that the variation of the master cylinder pressure is equal to or lower than the second adjusted threshold value and higher than the second threshold value.

11. The vehicle control device according to claim 7, wherein the determination portion determines whether the variation of the master cylinder pressure is equal to or lower than a second adjusted threshold value which is higher than the second threshold value, the control portion controls the suspension to restrain the vehicle from swinging back from tilting forward by applying a damping force that is greater than the reference damping force to the suspension, the damping force that is smaller than the second damping force to the suspension, and the damping force that is based on the variation of the master cylinder pressure to the suspension in a state where the determination portion determines that the variation of the master cylinder pressure is equal to or lower than the second adjusted threshold value and higher than the second threshold value.

12. The vehicle control device according to claim 8, wherein the determination portion determines whether the variation of the master cylinder pressure is equal to or lower than a second adjusted threshold value which is higher than the second threshold value, the control portion controls the suspension to restrain the vehicle from swinging back from tilting forward by applying a damping force that is greater than the reference damping force to the suspension, the damping force that is smaller than the second damping force to the suspension, and the damping force that is based on the variation of the master cylinder pressure to the suspension in a state where the determination portion determines that the variation of the master cylinder pressure is equal to or lower than the second adjusted threshold value and higher than the second threshold value.

13. The vehicle control device according to claim 9, wherein the determination portion determines whether the variation of the master cylinder pressure is equal to or lower than a second adjusted threshold value which is higher than the second threshold value, the control portion controls the suspension to restrain the vehicle from swinging back from tilting forward by applying a damping force that is greater than the reference damping force to the suspension, the damping force that is smaller than the second damping force to the suspension, and the damping force that is based on the variation of the master cylinder pressure to the suspension in a state where the determination portion determines that the variation of the master cylinder pressure is equal to or lower than the second adjusted threshold value and higher than the second threshold value.

14. The vehicle control device according to claim 6, wherein the control portion applies a smaller damping force than the reference damping force to the suspension after a predetermined time elapses from when the control portion applies the second damping force to the suspension.

15. The vehicle control device according to claim 7, wherein the control portion applies a smaller damping force than the reference damping force to the suspension after a predetermined time elapses from when the control portion applies the second damping force to the suspension.

16. The vehicle control device according to claim 8, wherein the control portion applies a smaller damping force than the reference damping force to the suspension after a predetermined time elapses from when the control portion applies the second damping force to the suspension.

17. The vehicle control device according to claim 9, wherein the control portion applies a smaller damping force than the reference damping force to the suspension after a predetermined time elapses from when the control portion applies the second damping force to the suspension.

\* \* \* \* \*